Patented Mar. 30, 1937

2,075,013

UNITED STATES PATENT OFFICE 2,075,013

ACYLAMINO ALKYL-ARYL ETHERS AND THEIR SULPHONATION PRODUCTS

Alfred William Baldwin, Blackley, Manchester, England, assignor to Imperial Chemical Industries Limited, a corporation of Great Britain No Drawing. Application September 4, 1935, Serial No. 39,185. In Great Britain September 4, 1934

16 Claims. (Cl. 260—124)

This invention relates to the manufacture of new compounds valuable as wetting, scouring, emulsifying and dispersing agents.

According to the invention, the new compounds are made by sulphonating acylaminoalkylaryl ethers of the general formula:

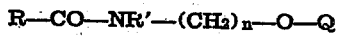

where R stands for a normal saturated aliphatic hydrocarbon radical containing at least 7 carbon atoms, R' stands for hydrogen or alkyl, $n$ is any number from 1–4 inclusive and Q stands for aryl.

Sulphonation is carried out very easily with sulphuric acid monohydrate at room temperature, sulphonation taking place smoothly and practically quantitatively in the aromatic nucleus of the aryl radical attached to the ether oxygen atom. Other sulphonating agents may be used if desired but it is unnecessary to use other than mild conditions.

The ethers used as starting materials for the present invention may be very simply prepared by reacting a higher saturated fatty acid with an aminoalkyl aryl ether of the general formula:

where R', $n$ and Q have the significance given above.

Suitable aminoalkyl aryl ethers are for example, β-amino ethylphenyl ether, γ-aminopropylphenyl ether, δ-aminobutylphenyl ether, β-aminoethyl-p-tolyl ether and δ-aminobutyl-p-tolyl ether. Suitable fatty acids are for example, palmitic, stearic, lauric or mixed coconut oil fatty acids.

Alternatively, the required ethers may be made by reacting an inorganic ester of an aryloxyalkyl alcohol with a suitable higher fatty acid amide or an alkali metal derivative thereof.

The products of the invention dissolve readily in water yielding clear foaming solutions which are unaffected by aqueous calcium chloride solutions or hot mineral acids and are valuable assistants in the treatment of textiles and leather. Those containing fatty acyl chains of 14–18 carbon atoms are exceptionally powerful detergents and dispersing agents, being particularly valuable for the dispersion of lime soaps, such as the scum obtained when scouring limey wool. They also possess good wetting and emulsifying power. The products derived from fatty acids containing 10–12 carbon atoms, however, possess exceptionally good wetting properties.

The invention is illustrated but not limited by the following examples in which the parts are by weight:

Example 1

15.1 parts of β-methylaminoethylphenyl ether, which is obtained as a colorless oil, B. P. 120–122° C. (15 m. m.) by interacting β-phenoxyethyl chloride (Jour. Amr. Chem. Soc. 1926, 48, 2745) with methylamine, are heated to 180–190° C. with 28.4 parts of stearic acid until water is no longer evolved. Unchanged amino ether and/or fatty acid are distilled off at about 250° C. under 5 m. m. pressure, and there is left the stearoylmethylaminoethylphenyl ether which, on cooling, is a wax-like solid, M. P. 20–25° C. 20 parts of this product are stirred into 30 parts of sulphuric acid monohydrate, at 20–25° C. When a test sample is found to dissolve in water to give a clear foaming solution, the sulphonation mixture is poured into enough aqueous caustic soda to give a neutral mixture. The cream or paste obtained is ready for use as a scouring or dispersing agent, but may be dried to a white granular solid, easily pulverized to a fine white powder. Aqueous solutions of the product are stable in the presence of calcium chloride or hot mineral acids and are particularly useful for scouring raw wool or for dispersing lime soaps in this and other washing and scouring operations.

Example 2

13.7 parts of β-aminoethylphenyl ether (Ber. 1897, 30, 810) are heated to 180–190° C. with 20 parts of lauric acid until water has ceased to be evolved. The resulting lauroylaminoethylphenyl ether is isolated and sulphonated by the methods described in Example 1.

Example 3

15.1 parts of β-methylaminoethylphenyl ether are interacted with 20 parts of lauric acid and the product sulphonated in the same manner as Example 2. The dried product is a fine white powder, readily soluble in water at room temperature to give solutions possessing powerful wetting-out action.

Example 4

13.7 parts of β-aminoethylphenyl ether are heated to 180–190° C. with 28.5 parts of stearic acid until water has ceased to be evolved. The product thus obtained may be easily purified if desired by re-crystallization from methyl alcohol to give white needles, M. P. 86–7° C. The crude, or purified stearoylaminoethylphenyl ether is then sulphonated as in Example 1 to give a product, which, although somewhat less soluble than the product of Example 1, is sufficiently soluble to form an excellent scouring solution at 45° C.

*Example 5*

15.1 parts of β-aminoethyltolyl ether, which may be made from pure o-, m- or p-cresol or the more readily available mixed cresols by making first the p-toloxyethyl chloride by a method strictly analogous to the preparation of β-phenoxyethyl chloride (loc. cit.) and converting to β-aminoethyltolyl ether by interaction with ammonia in known manner to yield a colorless oil, boiling, depending on the starting material, between 125° C. and 150° C. at 20 m. m., are heated to 170–180° C. with 28.5 parts of stearic acid until water has ceased to be evolved. The crude stearoylaminoethyltolyl ether thus obtained is a light-brown wax-like solid melting at about 60° C. It is sulphonated as in Example 1, the product being readily soluble in water to give solutions of excellent scouring power.

*Example 6*

If in Example 5 there are used 20 parts of lauric acid instead of 28.4 parts of stearic acid there is obtained a water-soluble product with similar excellent wetting-out properties.

I claim:

1. An acylamino alkyl-aryl ether having the general formula:

R—CO—NR'—(CH₂)ₙ—O—Q where R stands for a normal saturated aliphatic hydrocarbon radical containing at least seven carbon atoms, R' stands for one of the group consisting of hydrogen and alkyl, n is any number from 1 to 4 inclusive, and Q stands for an aryl radical of the benzene series.

2. A process for the manufacture of new wetting, detergent, emulsifying and dispersing agents which comprises sulphonating an acylamino alkyl-aryl ether having the general formula set forth in claim 1.

3. New wetting, detergent, emulsifying and dispersing agents having the general formula:

R—CO—NR'—(CH₂)ₙ—O—Q where R stands for a normal saturated aliphatic hydrocarbon radical containing at least seven carbon atoms, R' stands for one of the group consisting of hydrogen and alkyl, n is any number from 1 to 4 inclusive, and Q stands for an aryl radical of the benzene series which carries a sulphonic acid substituent.

4. An acylamino alkyl-aryl ether having the general formula:

R—CO—NR'—CH₂—CH₂—O—Q where R—CO— stands for an acyl radical derived from a normal saturated aliphatic monocarboxylic acid containing from ten to eighteen carbon atoms, R' stands for one of the group consisting of hydrogen and alkyl, and Q stands for an aryl radical of the benzene series.

5. New textile assistants having the general formula:

R—CO—NR'—CH₂—CH₂—O—Q—SO₃M where R—CO— stands for an acyl radical derived from a normal saturated aliphatic monocarboxylic acid containing from ten to eighteen carbon atoms, R' stands for one of the group consisting of hydrogen and alkyl, Q stands for an aryl radical of the benzene series, and M represents an alkali metal.

6. New wetting, detergent, emulsifying and dispersing agents having the general formula:

R—CO—N(CH₃)—CH₂—CH₂—O—C₆H₄—SO₃M where R—CO— stands for an acyl radical derived from a normal saturated aliphatic moncarboxylic acid containing from twelve to eighteen carbon atoms and M denotes an alkali metal.

7. A process of making a new textile assistant which comprises sulphonating an acylamino alkyl-aryl ether having the fomula:

C₁₇H₃₅CO—N(CH₃)—CH₂—CH₂—O—C₆H₅ where C₁₇H₃₅CO represents the acyl radical derived from stearic acid with sulphuric acid monohydrate and then neutralizing the sulphonation mixture with an aqueous solution of caustic soda.

8. A new textile assistant having the formula:

C₁₇H₃₅CO—N(CH₃)—CH₂—CH₂—O—C₆H₄—SO₃Na where C₁₇H₃₅CO represents the acyl radical derived from stearic acid.

9. A process for the manufacture of new wetting, detergent, emulsifying and dispersing agents which comprises sulphonating an acylamino alkyl-aryl ether having the general formula:

R—CO—NH—CH₂—CH₂—O—Q where R—CO— stands for an acyl radical derived from a normal saturated aliphatic monocarboxylic acid containing from twelve to eighteen carbon atoms and Q denotes a radical of the group consisting of phenyl and tolyl with sulphuric acid monohydrate and then neutralizing the sulphonation mixture with an aqueous solution of caustic soda.

10. An acylamino alkyl-aryl ether having the general formula:

R—CO—NR'—(CH₂)ₙ—O—Q where R stands for a normal saturated aliphatic hydrocarbon radical containing from nine to seventeen carbon atoms, R' stands for one of the group consisting of hydrogen and alkyl, n is any number from 2 to 4 inclusive, and Q stands for an aryl radical of the benzene series.

11. New wetting, detergent, emulsifying and dispersing agents having the general formula:

R—CO—NR'—(CH₂)ₙ—O—Q where R stands for a normal saturated aliphatic hydrocarbon radical containing from nine to seventeen carbon atoms, R' stands for one of the group consisting of hydrogen and alkyl, n is any number from 2 to 4 inclusive, and Q stands for an aryl radical of the benzene series which carries a sulphonic acid substituent.

12. New textile assistants having the general formula:

R—CO—NR'—CH₂—CH₂—O—Q—SO₃M where R—CO— stands for an acyl radical derived from a normal saturated aliphatic monocarboxylic acid containing from ten to eighteen carbon atoms, R' stands for one of the group consisting of hydrogen and alkyl, Q denotes a radical of the group consisting of phenylene and tolylene, and M represents an alkali metal.

13. New wetting, detergent, emulsifying and dispersing agents having the general formula:

R—CO—NH—CH₂—CH₂—O—Q—SO₃Na where R—CO— stands for an acyl radical derived from a normal saturated aliphatic monocarboxylic acid containing from twelve to eighteen carbon atoms and Q denotes a radical of the group consisting of phenylene and tolylene.

14. A new textile assistant having the formula:

$$C_{11}H_{23}CO-NH-CH_2-CH_2-O-C_6H_4SO_3Na$$

where $C_{11}H_{23}CO$ represents the acyl radical derived from lauric acid.

15. A new textile assistant having the formula:

$$C_{17}H_{35}CO-NH-CH_2-CH_2-O-C_6H_3CH_3-SO_3Na$$

where $C_{17}H_{35}CO$ represents the acyl radical derived from stearic acid.

16. New textile assistants having the general formula:

$$R-CO-NH-CH_2-CH_2-O-Q-SO_3M$$

where R—CO—stands for an acyl radical derived from a normal saturated aliphatic monocarboxylic acid containing from ten to eighteen carbon atoms, Q denotes a radical of the group consisting of phenylene and tolylene, and M represents an alkali metal.

ALFRED WILLIAM BALDWIN.